United States Patent [19]

DeBiasse et al.

[11] Patent Number: 5,474,307
[45] Date of Patent: Dec. 12, 1995

[54] PISTON RING EMPLOYING ELASTOMERIC SEALING MEMBER WITHIN THE RING GROOVE

[75] Inventors: Richard DeBiasse, 10 Central Ave., Madison, N.J. 07940; Donald J. Altobe, Trenton, N.J.

[73] Assignee: Richard DeBiasse, Madison, N.J.

[21] Appl. No.: 401,649

[22] Filed: Mar. 10, 1995

Related U.S. Application Data

[60] Continuation of Ser. No. 112,667, Aug. 26, 1993, abandoned, which is a division of Ser. No. 563,395, Aug. 6, 1990, Pat. No. 5,253,877.

[51] Int. Cl.$^6$ ........................................... F16J 15/46
[52] U.S. Cl. .................... 277/165; 277/168; 277/174; 277/176; 277/177
[58] Field of Search ................................. 277/165, 168, 277/174, 169, 176, 177, 199, 216

[56] References Cited

U.S. PATENT DOCUMENTS

| | | |
|---|---|---|
| 1,726,714 | 9/1929 | Pepler . |
| 2,631,907 | 3/1953 | Johnson, Jr. ............. 277/165 X |
| 2,889,183 | 6/1959 | Peras ........................ 277/169 |
| 3,583,293 | 6/1971 | DeBiasse . |
| 3,771,800 | 11/1973 | Wilson et al. ............ 277/169 X |
| 3,839,996 | 10/1974 | DeBiasse . |
| 3,926,166 | 12/1975 | Packard . |
| 4,592,559 | 6/1986 | Harvey .................... 277/176 X |
| 4,714,259 | 12/1987 | Mack et al. .............. 277/165 |
| 5,001,965 | 3/1991 | Ruddy et al. ............ 277/176 X |
| 5,275,422 | 1/1994 | Rehfeld ................... 277/165 X |

FOREIGN PATENT DOCUMENTS

| | | | |
|---|---|---|---|
| 870532 | 3/1942 | France | 277/168 |
| 910655 | 6/1946 | France | 277/176 |
| 3207810 | 9/1982 | Germany | 277/168 |

Primary Examiner—William A. Cuchlinski, Jr.
Assistant Examiner—Scott W. Cummings
Attorney, Agent, or Firm—Morgan & Finnegan

[57] ABSTRACT

A piston head assembly has one, two or more grooves to receive piston rings. One or more of the grooves may receive multiple piston rings. A circumferential groove from the bottom of the elastomeric material allows oil pressure to aid in sealing. A novel piston ring employs a circumferential channel facing outwardly with a shorter bottom channel facing outwardly with a shorter bottom channel sidewall. The elastomeric material extends to form a circumferential extension cooperative with a subgroove of the piston ring groove.

29 Claims, 7 Drawing Sheets

PISTON RING EMPLOYING ELASTOMERIC SEALING MEMBER WITHIN THE RING GROOVE

This is a continuation of application Ser. No. 08/112,667, now abandoned, filed on Aug. 26, 1993, which in turn is a division of application Ser. No. 07/563,395, filed on Aug. 6, 1990, now U.S. Pat. No. 5,253,877.

The present invention relates to piston ring configurations and more specifically to single and two-ring configurations of pistons which further the concepts expressed in the applicant's U.S. Pat. No. 3,583,293.

BACKGROUND OF THE INVENTION

U.S. Pat. No. 3,583,293 refers to numerous ways in which a piston for use in an internal combustion engine can be designed for optimum efficiency.

Proper functioning of the piston and piston rings is essential for an efficient compression-combustion-expansion process, and therefore the requirements made on these components are many and severe.

There are two different types of piston rings in normal internal combustion engines, compression rings and oil scraper rings. The most important requirement of the compression rings is to form a gas-tight seal between the piston and the cylinder wall. If the compression ring seal is ineffective, excessive "blow-by" will occur, resulting in an overall decrease of engine efficiency and life. The oil scraper ring acts to prevent the drawing of oil into the area above the sealing rings by applying significant pressure, known as "radial load", against the cylinder wall.

The basic design of the piston ring has not changed since its original conception and there are certain drawbacks to the conventional piston ring arrangement that should be examined in order to better understand how the present invention overcomes the shortcomings of current piston and ring design.

Piston rings currently in use seal against gas pressure created above the piston during the compression-combustion-expansion process by two different methods; one is the bearing of the ring against the walls of the cylinder (i.e., radial loading) and the second is the bearing of the ring against the upper or lower face of the ring land.

With respect to the former, effective sealing by the piston ring can only be accomplished when there is adequate gas pressure behind the ring forcing it radially outward. The radial force exerted by a piston ring in tension is not in itself enough to effect proper sealing under most conditions. The pressure behind the ring must be nearly equal to the pressure above the piston, otherwise the ring will collapse radially inward, and no longer seal. Indeed, during normal operation of an engine with rings, grooves, and cylinders in good condition, the pressure behind the topmost piston ring is nearly equal to the pressure in the cylinder and progressively lower pressures exist behind the second and third rings.

Thus, the compressed gases must have free access to the space behind the rings in order to have effective sealing. Ring-land to ring clearance must provide the necessary space for gas accessibility, but must not allow the ring to slam up and down in the groove. Such motion will lead to an ineffective seal at the top or bottom of the ring land and lead to excessive wear of this area of the piston. In the case of aluminum/alloy pistons, this motion can also cause the ring land to break away from the piston.

In addition, "ring flutter", which is encountered at high RPM, is caused when the inertial load of the ring during the compression stroke exceeds the combined gas pressure and wall friction which seats the ring in the ring-land bottom, causing the ring to lift off its seat. Once this occurs, the gases behind the ring, which are essential to the sealing ability of the ring, escape and the ring collapses.

In summary, the most effective seal obtainable from a traditional piston/ring configuration relies on the optimum and equivalent translation of combustion pressure above the piston to outward pressure of the ring against the cylinder bore, a relationship which must occur while maintaining an effective seat between the ring and the top or bottom of the ring groove.

It is generally accepted that the piston and piston ring assembly are the most critical components and the highest contributors to friction in the internal combustion engine.

In internal combustion engines, friction at the piston assembly occurs in several ways. First, the angularity of the rod in relation to the cylinder bore creates a side load against the wall. The amount of friction resulting from this effect is determined by the length of the rod (its overall angularity) and the design and integrity of the piston skirt, which, in traditional designs, can have a tendency to radically deflect or deform in response to side thrusts created by the rod.

Second, the radial pressure of the ring against the cylinder wall, which is caused by the necessary presence of compressed gas behind the rings, as well as the inherent radial loading of the ring, cause the piston rings to drag against the bore. This is particularly true of rings which are spring loaded and have a large axial and/or radial dimension, such as the oil scraper ring. However, generally speaking, the more rings that are present, the greater the friction generated.

U.S. Pat. No. 3,583,293 presents the inventor's design of a piston with greater structural rigidity. In this design, the stability of the piston in the bore, maintained previously to a great extent by an oil ring with a very high radial load, was instead maintained by a very rigid piston with a skirt having multiple parabolas which held the deflection of the piston in the bore to a minimum. The enhanced stability offered by this design was further complemented by the presence of the single ring land, which allowed placement of the wrist pin hole closer to the crown, increasing connecting rod length and decreasing the angularity of the rod.

The single, stepped ring groove housed three component parts. The lower ring, situated in the stepped portion of the groove, was called a "rail", and was of diminutive radial and axial dimension. It acted to close the end gap of the upper Compression ring, providing a better seal. Above the rail was a more standard compression ring backed by an oil ring expander. Placement of the oil expander ring behind the compression ring was intended to achieve the proper radial load of the compression ring against the cylinder bore.

In addition, the design provided for numerous perforations, located at the bottom edge of the ring belt, called "oil drainbacks", which diverted oil on the cylinder bore through the piston wall, reducing the accumulation of pressure at the bottom of the lower ring created by the pistons downward travel. This reduced the radial load requirements of the ring package, allowing better contact between the entire ring package and the cylinder wall. The diversion of oil to the underside of the pistons crown, combined with the improved heat dissipation characteristics of the less massive ring belt, also reduced the operating temperature of the piston.

In practice, the rigid skirt with its oil drainbacks, combined with this innovative piston ring configuration, led to a significant reduction in overall friction and provided for a better seal between the rings and the cylinder bore. However, it soon became apparent that the improved seal resulted in less effective oil control. Somehow, oil was travelling beyond the piston into the combustion chamber. Initially, it was not clear whether the oil was passing beyond the face of the ring package along the cylinder wall or behind the rings at the inner portion of the ring groove. In an effort to determine the cause, the standard oil ring expander behind the compression ring was replaced by a round (in cross section) elastomer "O" ring. The purpose here was to inhibit the flow of oil around the back of the rings, eliminating this route as a variable.

Subsequent testing indicated that oil consumption was radically increased. At this juncture, it was hypothesized that the oil was bypassing the face of the ring package during the intake stroke in response to an increased vacuum created above the piston as it travelled downward in the cylinder bore. This phenomenon, caused by the pressure differential, was made only more acute with the use of the "O" ring behind the top compression ring. In effect, the oil was being "pushed" upward, making its way past the piston by "hydroplaning" the ring package off the cylinder wall during the intake cycle. While virtually eliminating blow-by on the compression stroke, the new ring pack configuration exacerbated the oil control problems of the earlier design by preventing any measure of pressure equalization during the intake stroke.

In order to maintain the benefits of an improved seal during the compression stroke without the deleterious oil control effects, it was determined that the pressure differential created above and below the piston during the intake stroke had to be eliminated. As discussed in U.S. Pat. No. 3,839,996, a vacuum balance system (VBS) was, therefore, implemented through which the combustion chamber and crankcase were connected, sharing a common environment during the intake cycle. The addition of VBS to the rigid skirt, single ring combination, virtually eliminated oil consumption while retaining the benefits of a lighter, more rigid piston assembly with improved sealing capabilities.

THE NATURE OF THE PRESENT INVENTION

The present invention builds on the inventor's inventions of the past, but also provides for the possibility that vacuum balance will not be used in all engines. Where vacuum balance is employed the present invention enables the use of a single groove and compression ring or stepped groove using a rail and compression ring. The compression ring is backed by a new type of the elastomeric ring seal, no longer of the simple O-ring type. In the preferred stepped groove construction fitting into the stepped channel portion of the single groove is a rail which functions to close the end gap of the compression ring. In certain applications, particularly where vacuum balance is not employed, a second lower wiper ring of novel configuration may be employed. Alternatively, the functional aspects of the wiper ring may be combined into the compression ring or the rail.

More specifically the present invention consists of a piston head in the circumference of which is formed an annular recess. Said recess is comprised of an annular groove having upper and lower side walls extending generally radially into the head and terminating at an inner wall. In single groove constructions a preferred groove arrangement has one of the groove sidewalls extending from the circumference of the piston head, while the other sidewall extends only to an annular channel having a sidewall generally parallel to the sidewalls of the annular groove. The annular channel, which is an enlarging part of the annular groove, extends radially into the head from the circumference of the piston head to a second inner wall defining a step in the composite groove. The second inner wall terminates the shorter groove sidewall at a lesser radial depth than the inner wall of the annular groove and the channel formed thereby provides a recess of stepped configuration. The first split resilient piston ring has a radially inward extending portion received with axial clearance between said upper and lower sidewalls of said groove and extends radially outward from the groove to enable cylinder engagement. A resilient elastomer sealing ring elongated in the direction of the annular groove within the annular groove between the groove sidewalls and in contact with the inside edge of the first split resilient piston ring and the inner wall of the groove is so arranged that the elastomer experiences a slight crush radially urging it into its bounding members. A second split resilient piston ring is received in the channel adjacent the first ring and in an abutting engagement with the first split piston ring, but with its split ring gap offset from that of the first ring.

Especially where vacuum balance is not used, a second groove may be provided to receive a second split resilient piston ring. The second ring employed within the second groove below the first groove away from the crown of the piston, herein also referred to as the top of the piston, preferably serves as an "oil wiper" ring. Said oil wiper ring preferably has an extension extending its contact surface below the ring away from the crown of the piston. That extension may be composed of an elastomeric material fixed to the metallic ring and provided with structural features enabling its deformation by the cylinder wall into which it is designed to extend. The material for the wiper is selected on multiple bases including particularly wear characteristics of the wiper material, effective wear of the wiper on the cylinder bore and conformability of the wiper material to the bore.

The present invention also contemplates combinations of the compression ring and the lower wiper ring in a single groove and even a composite structure employing a single groove. That groove may or may not be stepped, but the lower ring away from the dome of the piston would function both as a compression ring and as an oil wiper ring. All or part of the upper outer face of this wiper ring may be composed of a variety of materials selected on the bases of wear characteristics of ring face material, wear characteristics of ring face on cylinder bore, and/or a conformability of ring face to cylinder wall. The wiper portion of the ring is similar in design and construction to that of the wiper ring described in the preceding paragraph. In the construction using a recess formed by the stepped upper wall of the groove, a rail is received in the recess above the compression ring. The compression ring is backed by the elastomeric sealing ring. The sealing ring may also assume many forms, some of which involve integrating the elastomeric sealing ring with the piston ring and some configuring the ring groove to cooperate with the sealing ring in cooperative geometries.

THE DRAWINGS

FIG. 1 is a schematic view of a cylinder in section and a piston configuration of the general single groove type disclosed in U.S. Pat. No. 3,583,293;

5

SPECIFIC DESCRIPTION OF THE DRAWINGS

Figure 1:
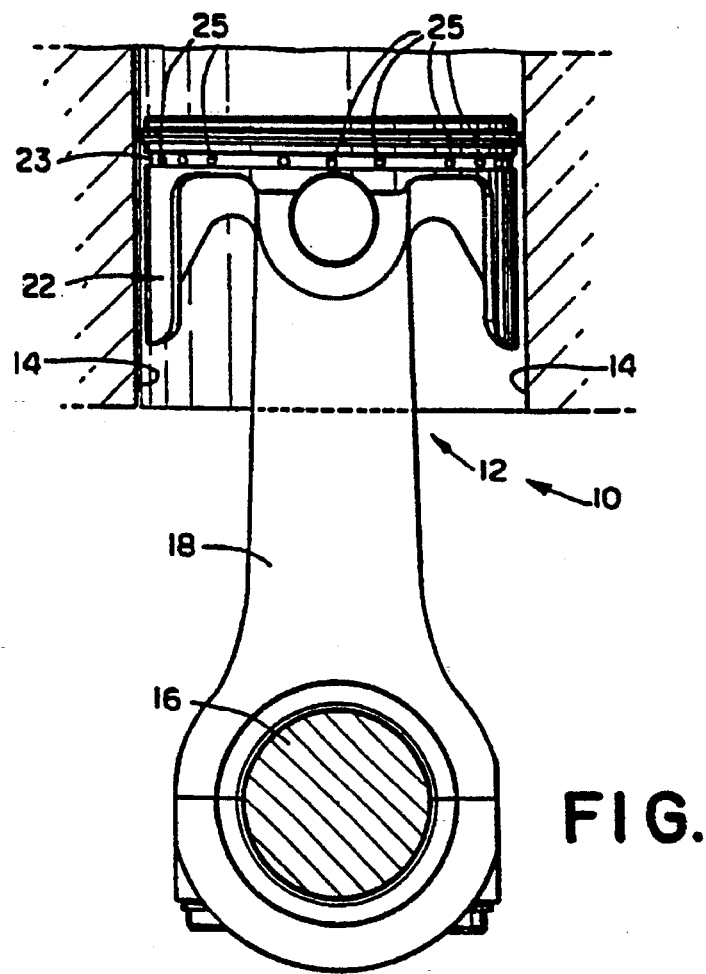

FIG. 1 shows part of an internal combustion engine in highly schematic form wherein a cross section is taken on the crankcase 10 showing piston 12 in elevation in a cylinder 14 shown in section. Within the crankcase is a crankshaft 16 which drives a plurality of piston rods 18 connected to the piston heads 22 by wristpin connections 24.

Figure 2:
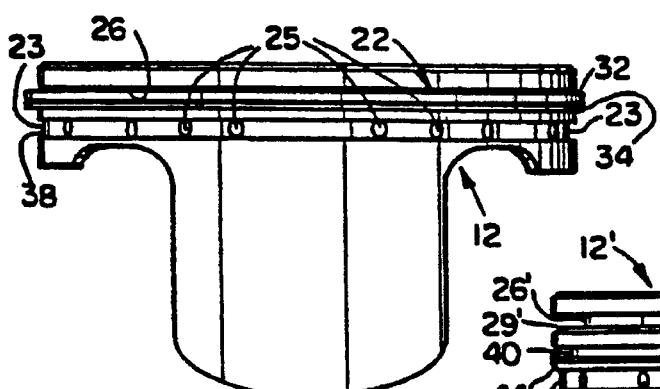
FIG. 2 is a somewhat enlarged elevational view of the piston head of FIG. 1 viewed from 90° from the viewing position of FIG. 1.

Referring now to FIG. 2, the structure shown is a piston head 22 having a single stepped groove 26 similar to the form disclosed in U.S. Pat. No. 3,583,293. This groove as better seen in FIG. 4 contains compression ring 32 in main groove 26 and rail ring 34. The rail 34 lies in a stepped offset

6 channel 29. The piston head has recessed regions 23 below stepped groove 26 which collect oil as it is scraped away from the inside of the cylinder wall and drain ports 25 allowing the collected oil to flow to the inside of the piston.

Figure 3:
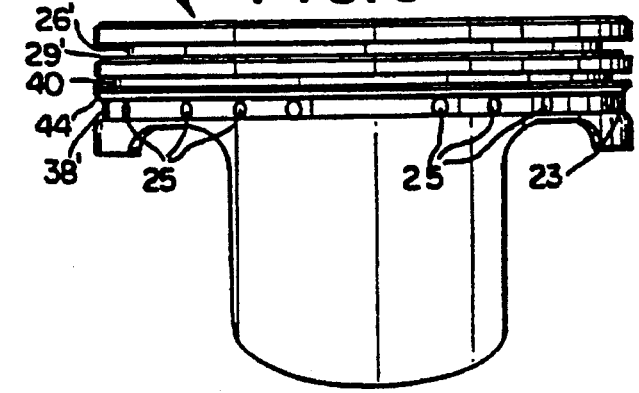
FIG. 3 is a variation of the piston head of FIG. 1, but employing a pair of ring grooves and viewed from the same side as in FIG. 2, but shown in axial section.
Figure 6:
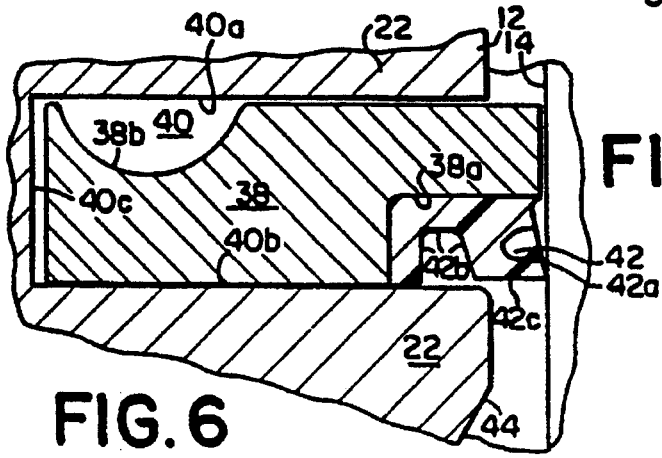
FIG. 6 is a similarly enlarged axial sectional view on the scale of FIG. 4 through the lower groove in the piston of FIG. 3 showing a novel elastomeric oil wiper and ring configuration in that groove.

FIG. 3 shows a two groove piston 12' having a first stepped groove 26' for carrying a compression ring and rail and a second groove 40 preferably carrying a circumferential wiper as seen in FIG. 6. Both the FIG. 2 single groove and the FIG. 3 two groove pistons are subject to variations.

Figure 4:
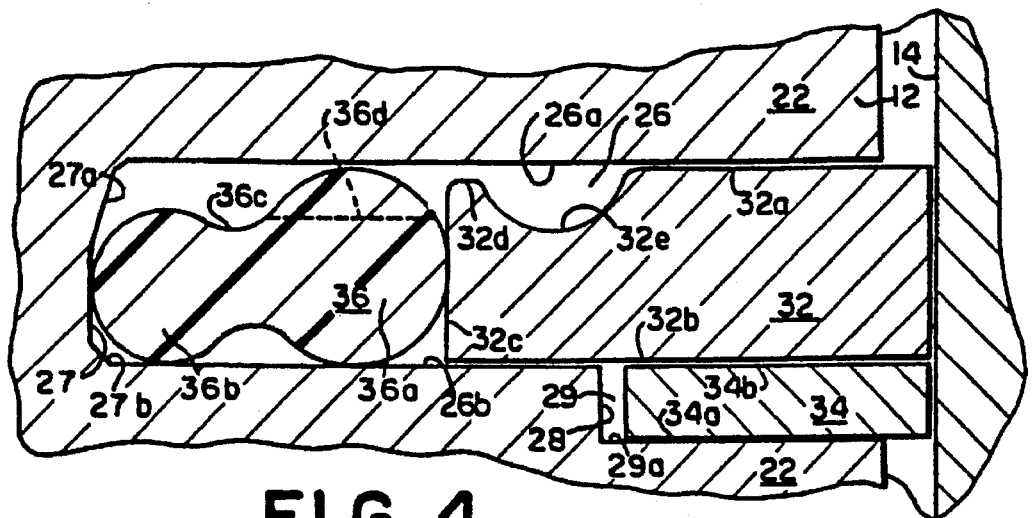
FIG. 4 is a much enlarged partial axial sectional view taken through a ring groove portion of a piston head, either in accordance with FIG. 2 or FIG. 3, showing a single stepped groove containing a rail, a compression ring and an elastomeric seal in accordance with the invention.

FIG. 4 is an enlarged partial view of an axial section through the piston showing a ring groove similar to that of FIG. 2 of U.S. Pat. No. 3,839,996 having corresponding parts in a stepped piston ring groove. More specifically, what is shown is a section taken radially through an annular groove 26 having upper and lower sidewalls 26a and 26b extending generally radially and parallel to one another into said piston head and terminating at an inner circumferential wall 27. One of the groove walls 26a extends from the outer surface of the piston head to inner wall 27. The other wall 26b terminates at a shoulder wall or step 28 extending to a bottom wall 29a generally parallel to wall 26a which provides and defines an annular channel 29 forming part of groove 26. Channel 29 and the balance of groove 26 together form the stepped recess which extends radially into the piston all the way around the circumference. The first resilient compression piston ring 32 when in place in groove 26 extends radially from beyond the cylindrical face of the piston head 22 well beyond the shoulder 28 but not to groove back wall 27. Between the inside edge of ring 32 and wall 27 is the specially shaped elastomeric ring 36, composed of heat resistant resilient material such as Dupont's Viton®, a fluoroelastomeric material.

Figure 5:
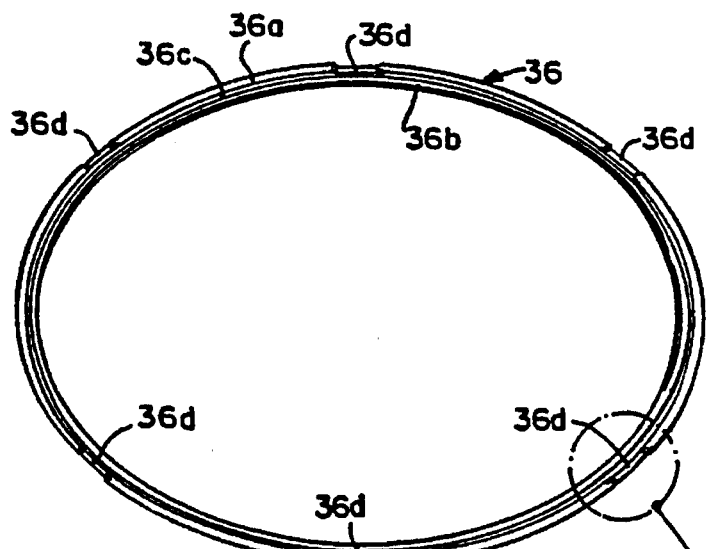
FIG. 5 is a perspective view on a reduced scale of the elastomeric ring of the type shown in FIG. 4.
Figure 5A:
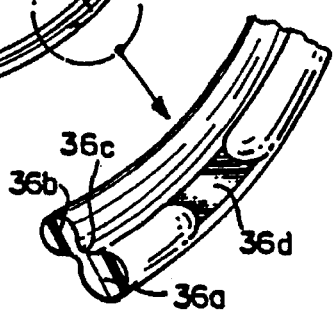
FIG. 5a is a partial enlargement of FIG. 5 to show detail.

Elastomeric ring 36 is also illustrated in perspective in FIG. 5 and will be seen to have a cross section of what may be broadly described as a figure "8" on its side or an infinity sign. Geometrically the ring is advantageously composed of two nearly circular cross section torroidal pieces 36a and 36b connected by an innerconnecting web 36c providing smooth tangential transition to each of the ring surfaces and convex curved surfaces between them. Of course, all pieces are integrally molded and act as one piece without discontinuities between the portions. Outer ring portion 36a is of larger diameter such that it almost fills the groove axially between walls 26a and 26b but a small amount of clearance may be left. The inner ring is smaller and preferably arranged so that in relaxed condition it will lie against bottom wall 26b of the groove so that there is a substantially larger clearance between it and the top wall 26a than with part 36a. Larger ring portion 36a is also provided with periodic vents which in preferred embodiments are channels 36d having flat bottoms through the top edge of the portion 36a. These channels allow the passage of gases back and forth through the channels even when the ring part 36a is squeezed and fills the space between walls 26a and 26b so that the pressures on each side of ring portion 36a in the top of the groove will be the same. In a typical ring portion, 36a might be on the order of 0.031 inch radius; portion 36, 0.025 inch radius; the minimum thickness of web portion 36c, 0.030 inch with radii of the convex surfaces, 0.018 inch. The channels 36d in such a configuration might have a maximum depth of 0.015 inch.

When inserted into the ring groove 26 elastomeric ring 36 contracts so that inner edge of smaller portion 36b will be in contact with the end wall 27. When ring 32 is snapped into groove 26, its inside edge 32c will contact the outer edge of larger ring portion 36a. Preferably a very slight crush is imposed radially upon the ring 36, but not sufficient to distort the larger portion 36a into contact with the upper wall 26a. Top back edge 32d of compression ring 32 is somewhat shortened and rounded at the corner and into groove 32e. Rounded groove 32e in the top 32a of ring 32 extends from adjacent this back edge downward and back up to the top edge 32a. The purpose of groove 32e in the ring 32 is to increase the "bellvelle" effect whereby a slight twist is imposed on the ring which tends to be corrected as the gas pressures encountered along the top back act to flatten the ring and improve the sealing. As is conventional a slight clearance is provided between the rings 32 and the groove and to allow gases to flow over the top 32a of the ring, swirl slightly and expand in the groove and aid in pressing the ring against the bottom wall 26b and rail 34 thus allowing gas pressure to build behind ring 32 and push it against cylinder wall 14.

Rail 34 is also a split resilient steel piston ring dimensioned to fit in the channel portion 29 with just a slight clearance from step 28. The rail 34 is preferably dimensioned to have the same thickness as the step so as to effectively extend the bottom wall 26b relative to the ring 32 to provide support for ring 32. As shown in this embodiment it serves primarily to cover the gap in split compression ring 32 and minimize gas and oil bypass through between the split ends of ring 32. It will be understood that both piston rings 32 and 34 are split to allow each ring to be expanded and inserted into the recess, but the gaps in the respective rings are staggered. Rail 34 is much smaller than ring 32 and is made of a material that expands considerably less, thus allowing a smaller end gap in rail 34 and less opportunity for oil or gas to pass by. Those skilled in the art will understand that the size of the end gap of the rail 34 is dependent upon its position relative to the compression ring. If positioned above the compression ring, the end gap must be larger to allow for greater expansion which occurs due to its proximity to the hot combustion gases. If positioned below the compression ring, gap size may be decreased.

Sealing ring 36 is similar to an "O" ring construction and is inserted the same way, the elastomer permitting stretching to allow the ring to pass over the head and snap into the groove. The purpose of the sealing ring 36 is to provide improved sealing behind the compression ring using the vents or passages 36d to provide distribution to all parts above the sealing ring. The gases entering from the cylinder above the piston upon combustion will tend to drive the ring 32 downward, pass over the ring and through the channels 36d, thereby exerting pressure on the entire top side of the sealing ring. The gases do not tend to force the portion 36a away from the back of the ring 32c because pressure is distributed to both sides of portion 36a and the downward pressure tends to compress the ring and force it to press harder against the ring 32 and toward the groove end wall 27. The back portion 36b of the sealing ring 36 is smaller, and, should oil force its way under ring 32 to the sealing ring, the oil may start to lift the elastomeric ring 36 off of the bottom 26b which will push the smaller ring portion 36b up toward the top wall 26a of the channel. In doing so, it will encounter the portion 27a of the end wall 27 which provides an outwardly tilted frustoconical surface which increases in diameter toward the top of the piston head, thus tending to impose a wedging effect on the ring 36 as portion 36b is driven up thereby increasing the radial crush and improving the seal.

In operation the rings 32 and 34 are going to be subject to forces tending to drive them axially first one way and then the other. Particularly on ignition the forces imposed by the expanding gases are extremely great and it is important that compression ring 32 maintain its seal against the cylinder, preferably meeting its cylindrical edge squarely against the cylinder wall. The gases passing above the ring will pass through the ducts 36d and cause the pressure to be distributed above the entire seal forcing it down and outward at each edge into better contact with the adjacent sealing surface. On the intake cycle the forces on the oil at the cylinder walls can become very great and oil may back up under ring 32 and ring 36 driving ring portion 36b up its wedging wall 27a to increase the lateral pressure on the seal. The greater the oil pressure the greater will be the sealing force.

It will be understood by those skilled in the art that the dimensions of the ring and groove structures pictured in FIG. 4 are dictated by design criteria which are well understood in the art. While the sealing ring adds some further complexity it may be compared to the "O" ring shown in U.S. Pat. No. 3,839,996 and successfully used for some years now as the seal behind piston rings. However, for various reasons piston rings have been reduced in axial thickness and such reduction in the ring has necessitated thinner grooves as well. "O" rings, to be effective, are required to have an axial thickness greater than the groove. Because of the axial crush imposed on the O-ring there is a corresponding lateral spread. As the groove becomes narrower the volume to accommodate the spread decreases, but the amount of excess height must remain relatively fixed for the O-ring to function. Therefore the amount of spread into the available volume tends to fill the space and make the O-ring much less effective. The ring 36 of the present invention overcomes this problem.

The ring 36 not only improves the seal, but thickness of the sealing ring 36 can be somewhat reduced over that necessary for an "O" ring and need not experience the axial crush required for an O-ring. Ring groove 26 accommodating the ring 36, for example, might be 0.065 inches high axially and portion 36a of the ring 0.062 inches in thickness. Although the axial crush is eliminated in ring 36, a slight radial crush is necessary to its functioning. The radial dimension of the FIG. 8 sealing ring 36 might typically be on the order of 0.120 inches. It will be understood that dimensions in any design will depend upon the groove size and design criteria including the firmness of the elastomer. It can be stated as a general proposition that the ring seal should be dimensioned to be stable enough so that portion 36b does not tend to collapse on position 36a.

Although the configuration of FIG. 4 can be used in a single groove type arrangement shown in FIGS. 1 and 2, more likely it would be used with a two groove arrangement shown in FIG. 3 in a non-vacuum balance system (VBS). In such a configuration the extra lower groove shown in FIG. 6 contains an extra oil wiper ring, sometimes referred to as the "margin maker". According to one embodiment of the invention, seen in FIG. 6, the second ring 38 in groove 40 provides some slight clearance for the ring between parallel walls 40a and 40b not unlike that for compression ring 32. A much smaller clearance between the inside edge of the ring 38 and end wall 40c is employed if no inner seal is used in connection with this structure in this embodiment. The lower outer edge of the steel ring is cut away to form a circumferential recess 38a, within which a circumferential elastomeric wiper member 42 conforming to the shape of recess 38a is inserted. As previously mentioned the wiper material is selected to have good wear properties itself, to have minimum wear on the cylinder surface which it contacts and for its ability to conform to the surface of the cylinder. Wiper member 42 is a ring made of deformable elastomeric material such as the fluoroelastomeric material Viton® or other high temperature synthetic rubber. The elastomeric member 42 may be attached to the steel piston ring 38 only in places remote from ring 38 end gap so that the ring of elastomeric member 42 may be stretched as the piston ring 38 is opened to fit over the piston and into its groove. Alternatively, the ring 42 may be broken at the gap of ring 38, but in this embodiment the material of elastomeric ring 42 may be allowed to extend slightly beyond the edge of the end gap into a closed gap butt joint when the ring 38 is in place in the ring grooves.

As seen in FIG. 6, the wiper has its outside edge 42a cut back in diameter adjacent the remaining square circumferential outer edge of the ring 38 which is intended to seat and seal against the cylinder wall. Then that edge 42a progressively extends in a frustoconical surface to a ring location at the bottom of the material past the outer edge of the ring sufficiently that the elastomeric material must be deformed when the ring in the piston is inserted into the cylinder 14. A cutout provides a circumferential channel 42b extending upward from the bottom of the elastomeric wiper member 42. This channel serves to accommodate oil wiped by the wiper from the cylinder wall 14 and the hydrostatic pressure generated by this oil increases the outward force urging the wiper edge 42a into contact with the cylinder wall 14. Preferably the bottom edge 42c of the elastomeric member while parallel to the bottom of the ring 38 is also slightly above to give added clearance for the oil to enter circumferential channel 42b. The ring 38 itself is provided with a circumferential rounded groove 38b which functions much as groove 32e does in member 32 shown in FIG. 4. As seen in FIG. 3, the cylindrical sidewall surface of the piston head is bevelled inwardly forming face 44 beginning the oil collecting groove 23 below groove 40 which tends to collect oil stopped by the wiper of margin maker ring structure of FIG. 6 and direct the oil downwardly and toward drain holes 25 in the head, removing oil to the interior of the piston. In FIG. 6 the margin maker tends to act as something of a squeegee taking oil away from the cylinder surface. Designing the oil collection recess 38 and the number and size of its drain ports 25 in conjunction with the wiper design enables the designer to control the force exerted by the elastomeric lip against the cylinder wall by regulating the rate at which oil is drained to the center of the cylinder. Maintaining the proper balance of oil under the ring helps insure adequate outward pressure by that oil on the wiper to maintain a good seal adjacent the cylinder wall.

Figure 6A:
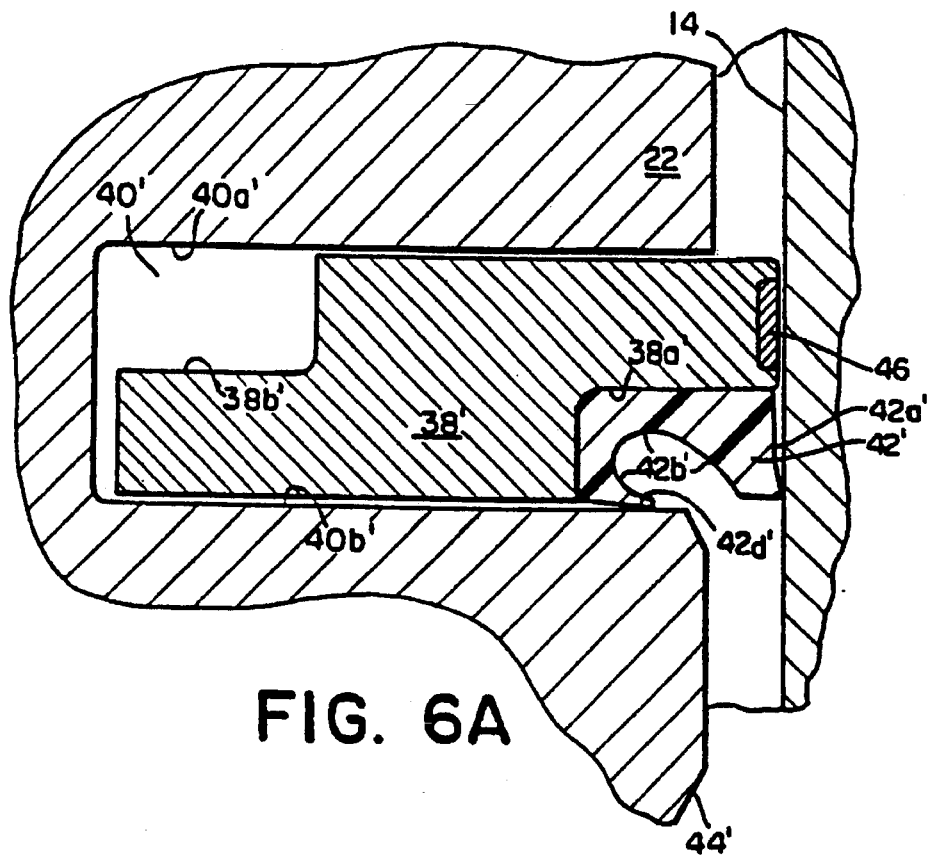
FIG. 6A is a view similar to FIG. 6 showing a variation on the oil wiper geometry.

Shown in FIG. 6A is a modified form of margin maker, the extra ring used for oil collection and diversion. Referring to FIG. 6A, it will be seen that the structure shown is quite similar to that of FIG. 6. The split ring 38' differs primarily in the nature of the elastomeric ring insert 42' which conforms to recess 38a', but is of different shape along edges away from the ring 38'. The outer edges of the ring 38' are chamferred so that the top outer edge of the elastomeric ring begins somewhat indented from the outside edge of the ring 38'. The configuration may differ in various applications, depending on such things as the amount of skirt deflection in the piston, for example. The insert 42' is quite similar to insert 42 but has a frustoconical lip portion 42a' terminated at its bottom in a circumferential ridge that extends further outward at a greater angle to the axis than portion 42a' to a diameter greater than the cylinder sidewall diameter. As in the FIG. 6 construction, the insert 42' is compressed as the piston is placed into the cylinder with the ring 38' in place. Also the shape of the circumferential groove 42b' allowing the lip portion 42a' to yield inwardly is somewhat changed to effect a continuous curve which terminates in a circumferential flap 42d'. As in the FIG. 6 construction, oil accumulates in the grooves and its hydrostatic pressure acts to urge the lip into cylinder 14. In addition the flap 42d' acts as a valve held closed by the pressure and surge of oil into groove 42b' to keep oil from passing under and around the back of ring 38'. It will be noted in FIG. 6A that the lower edge of the ring groove in the piston is chamferred instead of rounded as in FIG. 6. Again the piston is cut back from the cylinder wall in frustoconical surface 44' which forms the transition part of groove 23, seen in FIG. 3, directed toward drain holes 25 for disposal of oil accumulated between the cylinder and the piston.

Also instead of using the curved circumferential groove in the top of the ring, the back edge of the piston ring is stepped so that there is a circumferential notch 38b', which serves the same function as a groove, i.e., to create a bellvelle effect. The step wall of recess 38b' has its cylindrical elements parallel to the ring groove backwall, and the surface in which the step terminates is parallel to the top and bottom surfaces of the ring and groove walls 40a' and 40b'. Alternatively, a notch may be employed on the inside edge of the lower side of ring 38. Location of such a notch or groove depends on what happens to the ring while the elastomer is glued or otherwise adhered to the ring. Optionally on the outer edge of the ring there is a circumferential inlay of chrome, molybdenum or other material, selection of which will depend on application, to provide better wear qualities, to minimize wear to the cylinder wall and to provide better conforming to the cylinder wall.

Figure 7:
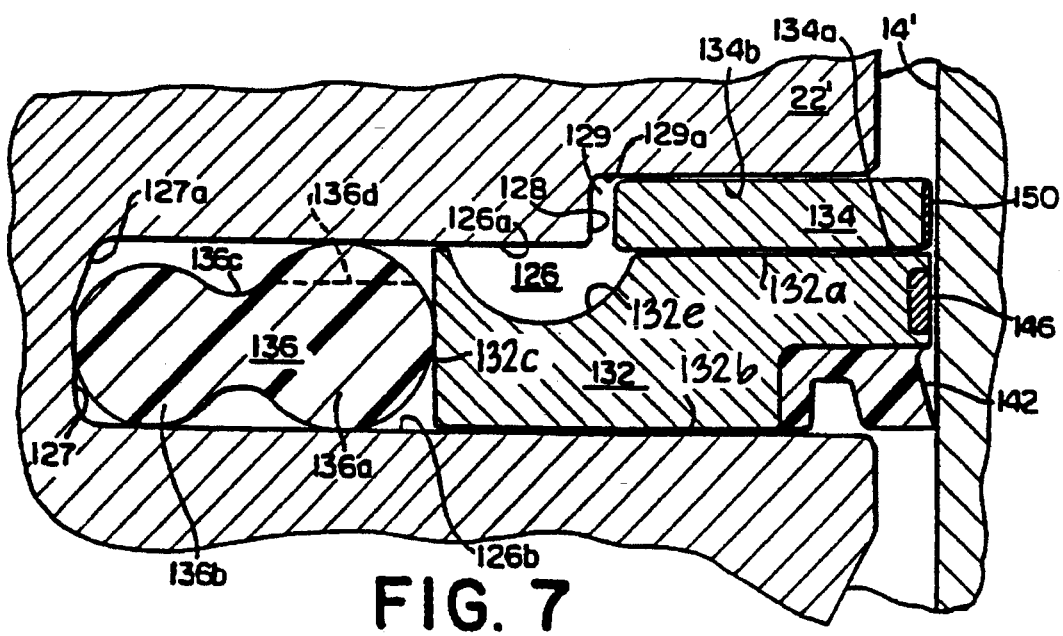
FIG. 7 is an enlarged partial view similar in scale to FIG. 4 in axial section through a different form of single groove of the FIG. 2 configuration including a single stepped groove containing an upper rail and a single ring having an elastomeric ring wiper contained therein.

FIG. 7 shows a single ring type construction of the type suggested by FIG. 2. In this particular construction there is a combination of some of the elements of the second ring of FIG. 6 with the upper ring of FIG. 4 so that supposedly one ring performs both functions. More specifically in this case there is a stepped groove inverted to that of FIG. 4, that is, the rail channel is above, rather than below, the compression ring. The main groove 126 is provided with parallel sidewalls 126a and 126b and end wall 127. The step 128 extends towards the top of the piston instead of toward the bottom and ends in an annular channel 129 having a side 129a parallel to wall 126a. The main piston ring 132 is similar to ring 32 in FIG. 4 except that it has combined the features of margin maker using an elastomeric wiper insert 142 of the type seen in FIG. 6. Also there is an insert 146, which may be any suitable material selected to give improved wearing properties to the surface itself, to minimize wear to the cylinder wall and to improve conformance with the shape of the cylinder surface. In some instances chromium may be suitable at the outer edge of the metal portion of the ring similar to the insert in FIG. 6A. The figure 8-shaped ring 136 is similar to the ring 36 of FIG. 4. The end wall 127 of the ring groove is chamferred to provide surface 127a of the same functional configuration as in FIG. 4 so that the operation of the sealing ring 136 is similar. Venting is provided over the first lobe 136a through the channels 136d. The rail 134, now placed above the compression ring 132, is oriented to close the gap in ring 132. In this case rail 134 is shown provided with a chromium face 150 for better wear and to minimize friction. Those schooled in art will understand that the end gap in ring 134 will have to be slightly larger than the gap of ring 34 in FIG. 4 because it will be exposed to hot combustion gases. Conversely the end gap or ring 132 may be slightly smaller than in ring 32 in FIG. 4 because it is shielded from those gases.

Figure 8:
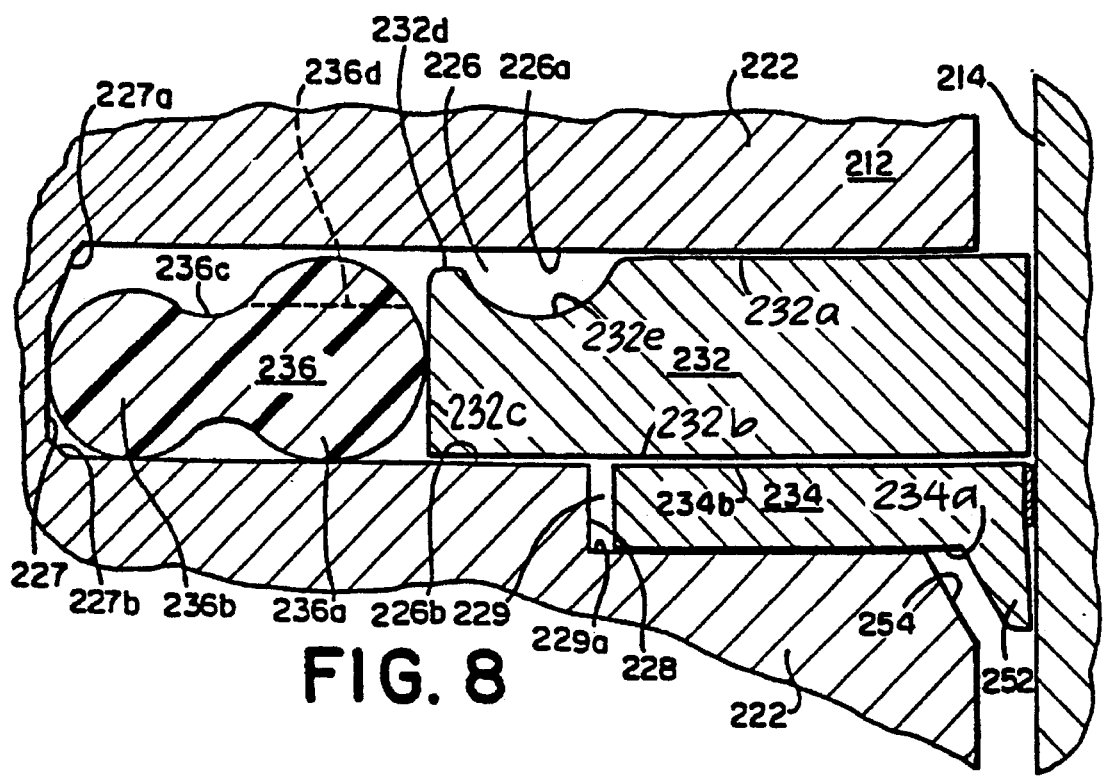
FIG. 8 is a partial sectional view similar to that of FIG. 4 through a groove showing a variation of the structure employing a stepped groove inverted relative to the FIG. 7 structure containing a modified rail provided with an extension serving as a scraper.

FIG. 8 shows a structure similar to FIG. 4 having the similar configured stepped groove, a compression ring 232, a similar sealing ring 236 and a rail member 234 which differs from rail 34 in FIG. 4 in that it provides an oil wiper 252. Although wiper 252 is metallic rather than a resilient compressible material, its circular blade end is thinned down to produce something of a blunt scraper edged blade. The upper portion of the outside surface of the ring 234 is designed to be cylindrical so as to be flat against the cylinder wall. The bottom portion of the outside surface of ring 234 is slightly frustoconical, the lower portion being designed so that the top of the blade at the lower edge of the ring touches the wall at the same time as the upper portion. The bottom of the blade is flat, and generally parallel to the groove and rounded into a back taper wall increasing in thickness toward the bottom rail wall 234a. The more rigid scraper 252 in use acts somewhat like its counterpart the resilient wiper 42 in FIGS. 6 and 6A since each wiper serves to collect and divert excess oil from the wall of the cylinder. In the context of this description therefore, what has heretofore been termed an "oil scraper" may be considered to be an "oil wiper". The bottom wall of the channel 229a itself is also chamferred adjacent the piston head wall at surface 254 to accommodate and provide clearance for the backside of the circumferential wiper 252.

Figure 8A:
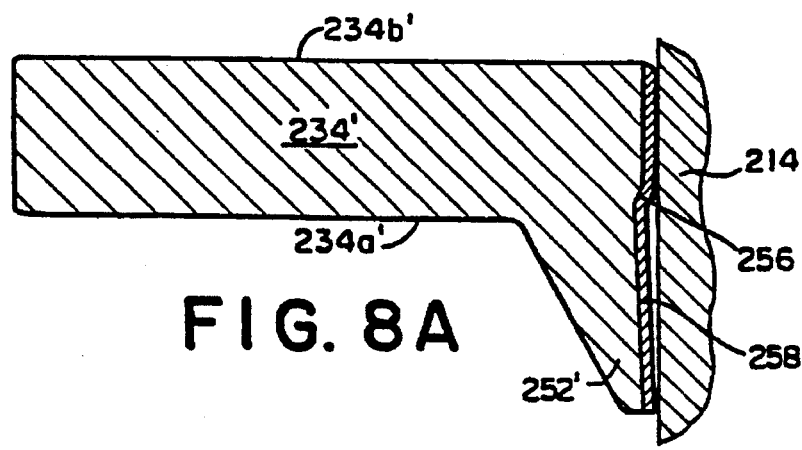
FIG. 8A is a further enlarged sectional view showing a variation in the scraper rail of FIG. 8.

FIG. 8A shows a variation of the rail wiper structure of FIG. 8 which has a slight change or discontinuity in outer diameter 256. A wear coating 258 follows the same shape as the outer surface, covering both the outside edge of the ring proper 234' and the wiper 252. The coating 258 must wear well itself, not be too abrasive on the cylinder walls and yet be capable of conforming to those cylinder walls.

Figure 8B:
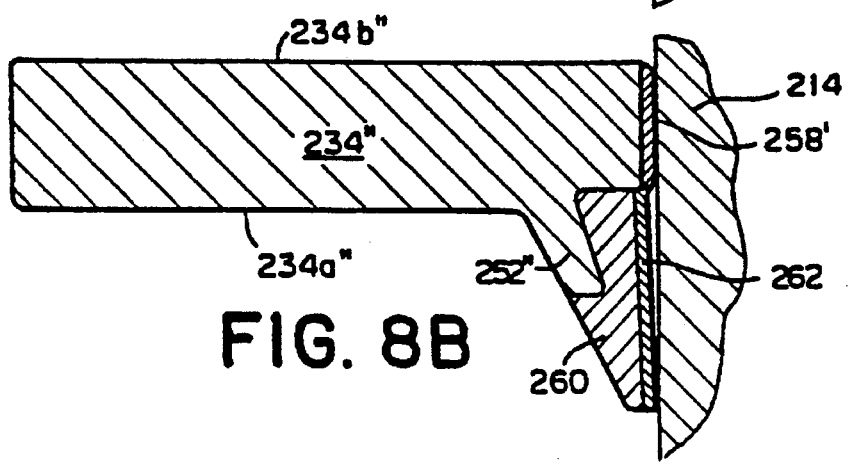
FIG. 8B is a view corresponding to FIG. 8A showing a further variation in the scraper rail of FIG. 8.

FIG. 8B shows still another variation of the same structure in which rail 234" is composed much more of a composite of materials. A steel stub 252" projecting downwardly from rail 234" is left and backs and accommodates a more flexible elastomeric material 260. The outer surface of the lip, in turn, is coated with an even more flexible and yielding elastomeric material 262. The elastomeric lip of the wiper is of larger diameter than the top of rail 234" since most elastomeric materials which may be employed yield more readily than metal. The outside edge of rail 234" in this case may be chrome plating 258' or other material to provide better wear qualities itself, reduce wear on the cylinder surface and conform better to that cylinder surface.

Figure 9:
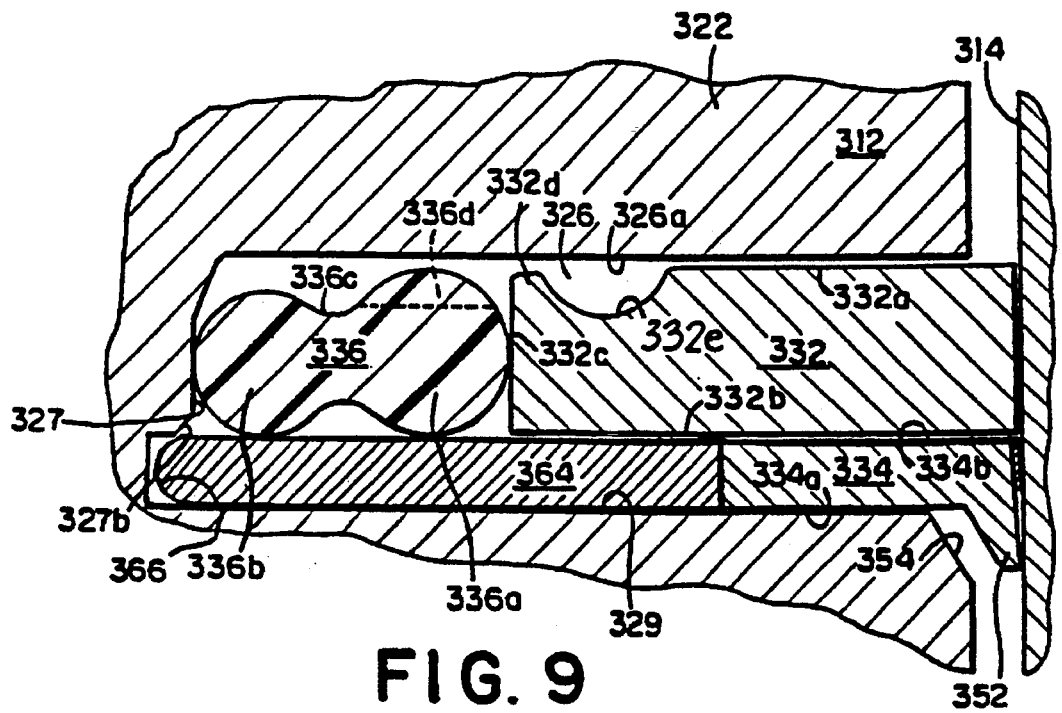
FIG. 9 is a view similar to FIG. 8 showing a modification of the groove to accommodate further ring structure.

FIG. 9 is still another variation of the structure of FIG. 8 showing essentially the same pieces, with the main ring 332 backed in this variation by the sealing ring 336 and having its gap covered by rail 334 which has a circumferential wiper flange 352. However, in this case the channel 329 for the rail is extended well beyond the back wall of the main groove and terminates in a sub-groove 328. In the rail channel 329 below the compression ring 332 and the sealing ring 336 is a rail 334 backed by a smaller diameter, but larger width ring 364 both rings having the same thickness and flat top and bottom surfaces. Ring 364 is intended to add its spring force to the sealing ring and extends into sub-groove 328 terminating in rounded inside edges. The sub-groove helps to hold ring 364 in place. The outside edge of ring 334 is like that of FIG. 8 and functions as a wiper in the same way.

Figure 10:
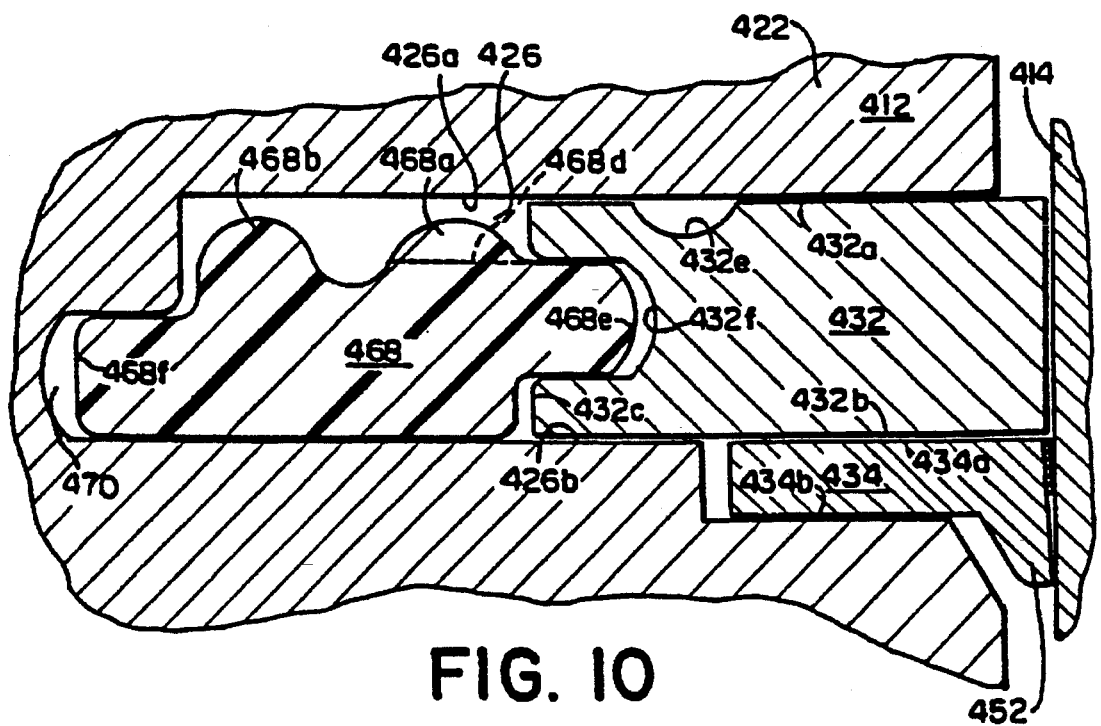
FIG. 10 is a view similar to FIG. 8 showing a modified rail scraper ring and a modified elastomeric seal with modifications in the groove and a compression ring to accommodate changes in the elastomeric ring.

FIG. 10 shows another variation in which the compression ring 432 is of essentially the same shape but with a re-entrant circumferential groove 432f on its inside edge 432c. To accommodate this groove the curved circumferential groove 432e on the top surface of the ring is moved radially further away from the inside edge. This groove in certain applications may be omitted, as it can in other embodiments. In this case, however, an entirely different shape or form of elastomeric sealing ring 468 is employed.

Elastomeric ring 468 is shown in this embodiment as having a pair of circumferential humps 468a and 468b which correspond in location radially and partially in function to the two round sections of the FIG. 8 ring 36 in FIG. 4. Also the hump 468a has radial channels through it similar to channels 36d in the sealing ring of FIG. 4. The channels 368d serve the same function as those of FIG. 4, to equalize pressure on each side of the hump 468a. In other respects sealing ring 468 is quite different. For example, it is provided with a circumferential ridge projection 468e having sides parallel to channel walls 426a and fitting snuggly within circumferential groove 432f at the inside edge of ring 432. A snug fit, but essentially no crush is provided by groove 432f to resilient elastomeric projection 468e. The bottom of ring 468, however, is essentially flat and is designed to lie flat against the bottom 426b of groove 426. Elastomeric ring 468 is extended at its inside edge by extension 468f having flat surfaces parallel to one another, one of which extends the bottom of ring 468 in this preferred embodiment. Extension 468f is terminated in an essentially cylindrical surface with slightly rounded edges. A flat inner edge of the ring is made to fit snuggly within the parallel walls of groove extension 470 which is narrower than the groove 426 and extends the groove radially only along its bottom to a height to snuggly accommodate the extension 468f of resilient elastomeric ring 468. The inner edge extension 468f effectively makes the same kind of snug connections with the piston that the extension 468e does with the ring so that both the inside and outside edge of the resilient ring are thus accommodated, yet radial movement of ring 432 is accommodated. With the two connections a relatively tight seal is formed. On the other hand, the gases are free to pass from the top of the cylinder through channels 468d to enter the space between the circumferential humps and thereby help better seal the ridges of elastomeric ring 468 to the piston ring and to the piston itself by urging extensions 468e and 468f further into their respective grooves.

Figure 11:
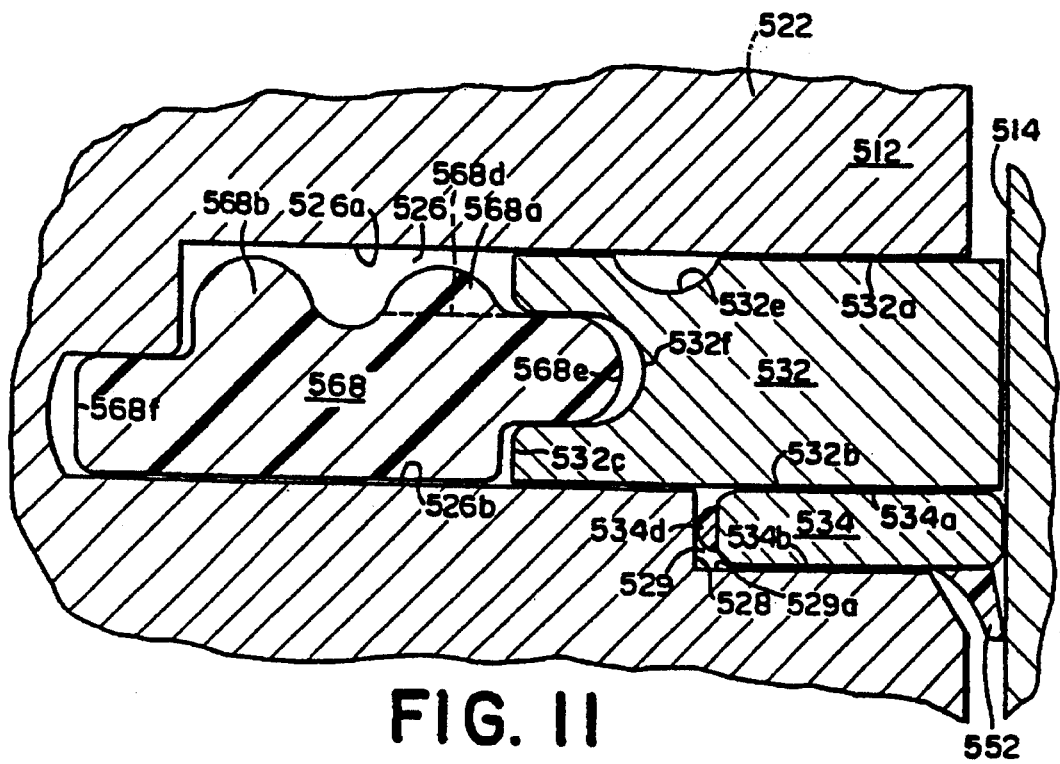
FIG. 11 is a view similar to FIG. 10 showing further modification particularly in the rail wiper structure.

A variation on the theme of FIG. 10 is seen in FIG. 11 wherein corresponding parts are given the same number designator but with a 500 prefix digit instead of a 400 prefix. FIG. 11 depicts a structure essentially like that of FIG. 10 but in which minor modifications are made to the rail 534 and wiper 552. In this case the circumferential wiper 552 is elastomeric in its composition but not supported in a recess. Ring 534 terminating the inside edge of rail 534 is provided with a circumferential bumper placed to impact the step 529. The portion of the inside edge of the wiper rail covered with elastomer is cylindrical but the edges above and below the bumper are rounded. The shape of the elastomeric wiper 552 vulcanized or otherwise bonded to rail 534 is subject to much variation as is the shape of edge ring 534d.

Figure 12:
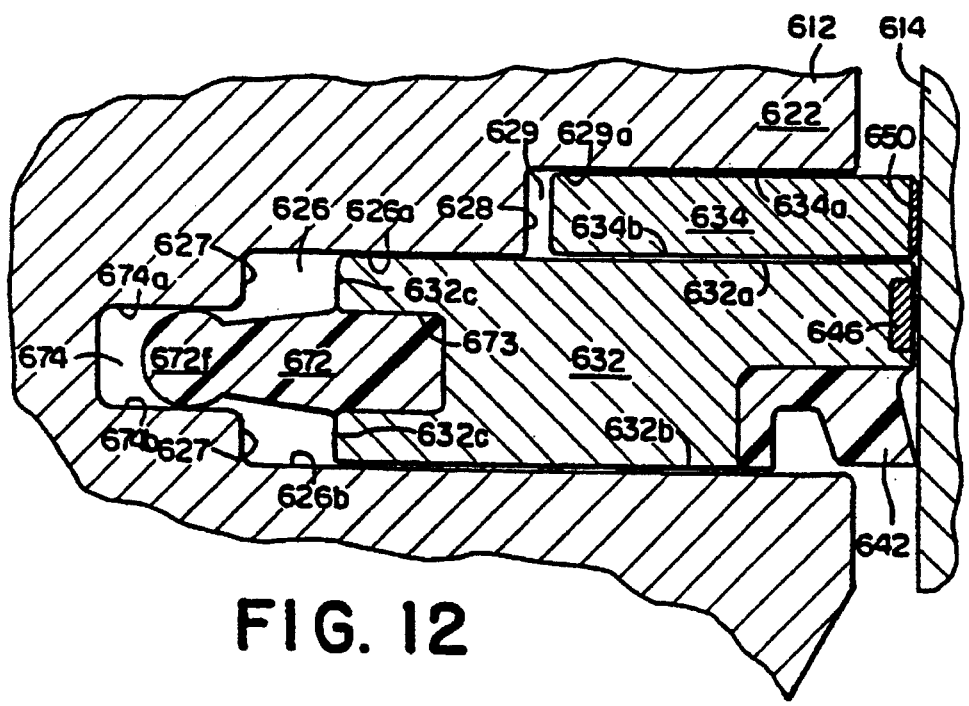
FIG. 12 is a view corresponding most closely to FIG. 7 showing similar composite ring structure but with a modified type of elastomeric seal behind the combination ring.

FIG. 12 presents still another configuration which is most similar to FIG. 7 and employs similar numbering for similar parts but with 6 in the hundreds position of the number designators. As in the case of the FIG. 7 structure the groove 626 is enlarged at the outer end by step 628 to provide a channel 629 for rail 634. Rail 634 is the same width as this channel 629 so as effectively to continue the upper wall 626a of groove 626. In effect compression ring 632 itself is provided with the margin maker features of the insert wiper 642 of elastomeric material similar to that employed in FIG. 7, and others. Above the wiper 642 the insert 646 in the outside edge of the ring 632 may be a material which itself will exhibit good wear qualities, will not cause excessive wear to the cylinder wall and will conform to the cylinder wall. The lower edge of the wiper 642 extends beyond the outside edge of ring 632 and to a position to begin to be deflected before the ring and its wear insert 646 contact the cylinder wall. Also in this embodiment another elastomeric ring insert 672 extends into and is bonded in circumferential groove 673 in the inside edge 632c of ring 632. Aligned sub-groove 674 into the piston extending the ring groove 626 through inside wall 627 snuggly accommodates the enlarged O-ring-like end 672f of circumferential elastomeric member 672 which at its inside edge is free to move in groove 674. Compression ring 632 and elastomeric member 672 on the other hand are bonded together so that the two are effectively mechanically one integral part. Inside wall 627 of the groove 626 is then not so far removed from the inside edge of piston ring 632.

Figure 13:
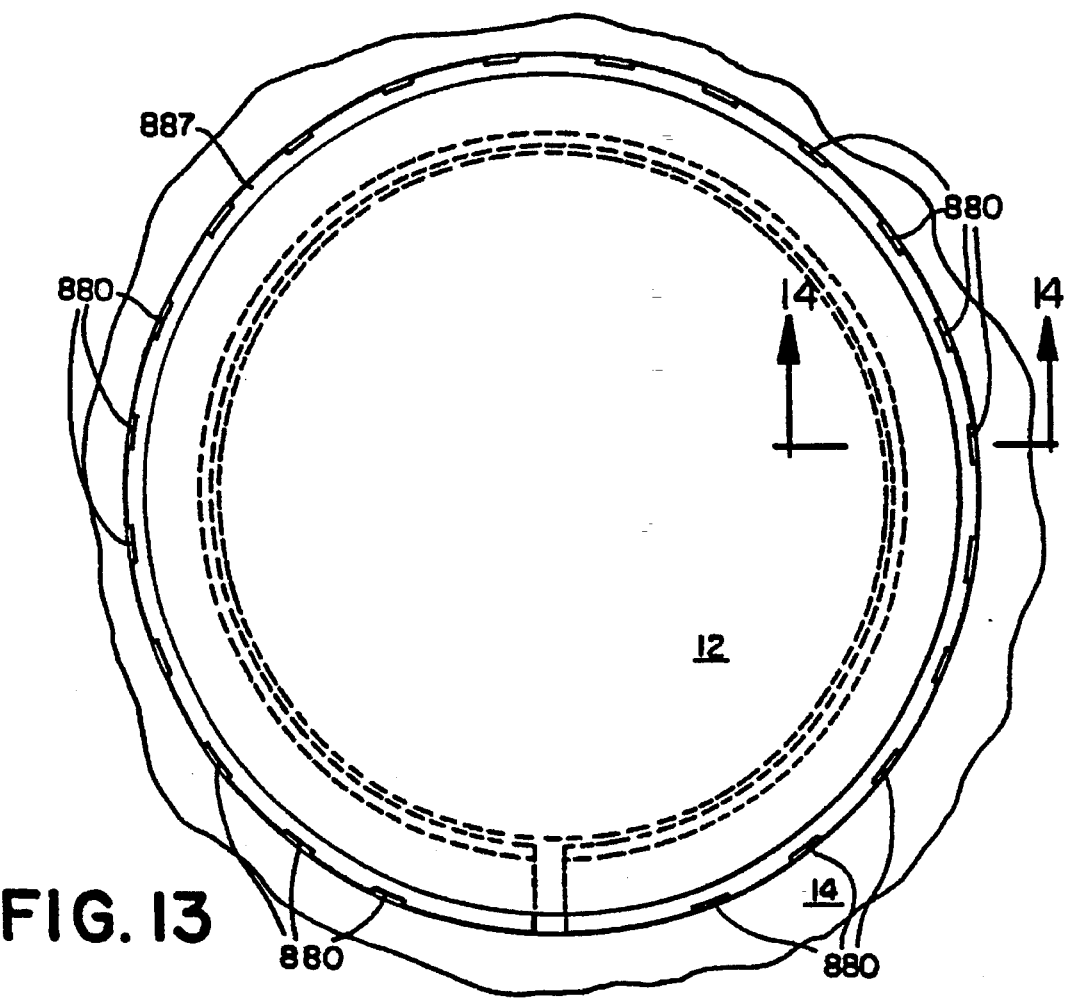
FIG. 13 is a plan view from above on a somewhat enlarged scale of an even more complex modification of a composite piston ring structure similar to that of FIG. 7.
Figure 14:
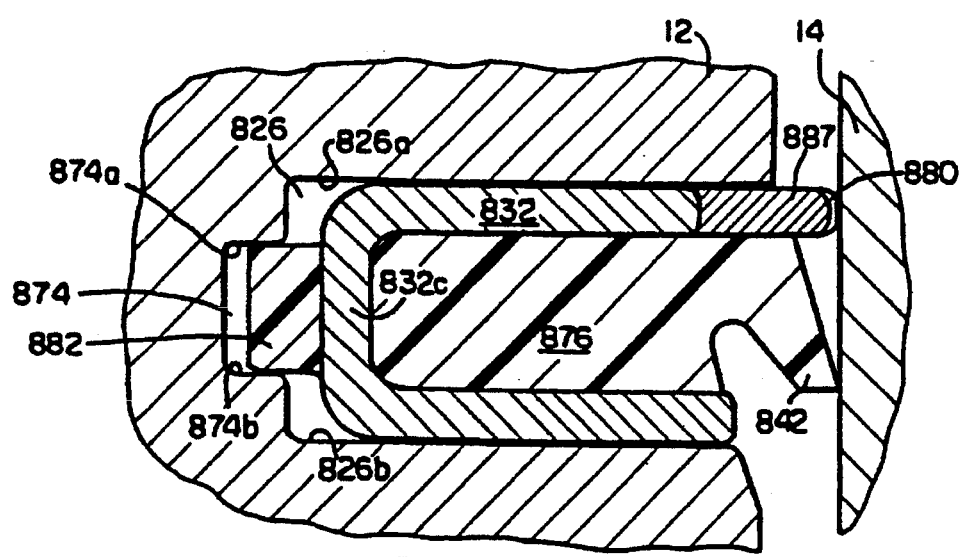
FIG. 14 is a much enlarged sectional view taken on line 14—14 of FIG. 13.

FIGS. 13 and 14 provide a ring and seal structure highly modified from that of the previous figures in which a composite single member is used to provide both the inside seal and the margin maker type wiper at the cylinder wall. In this case the piston ring is formed using circumferentially arranged channel ring 832 which opens outwardly and is filled with elastomeric material 876. FIG. 14 is a much enlarged sectional view taken along line 14—14 of FIG. 13.

The base 823c of the channel ring 823 is perforated and allows elastomeric material filling the channel to flow through the perforations and form sealing ring extension 882. The elastomeric material 876 terminates in a wiper edge 842 similar to the margin maker type structure. Ring groove 826 is uniform with its top wall 826a parallel to its bottom wall 826b which, however, is chamferred at its lower outer edge. Spring steel material of the piston ring 823 is terminated at the top channel sidewall in a castle pattern such that alternate portions contact the cylinder wall and intermediate portions are recessed therefrom. The top wall of the channel may also be terminated in another material 887 and tipped at cylinder contacting portions 880 with material providing good wear resistance while not causing excessive wear of the cylinder and conforming to the shape of the cylinder. The steel of the ring 832 is bonded to the elastomeric material 876 forming the core of the ring 832. Near to the back wall 832c the circumferential sealing extension 882 of elastomeric material is bonded to the metal ring and connected to the main body of elastomeric material 876, which extends radially inward with parallel top and bottom sides. The elastomeric extension is received within an extended narrower groove 874. Parallel upper and lower walls 874a and 874b snuggly receive the sides of the elastomeric ring extension 882.

A great many variations in the possible piston ring structures of the present invention have been displayed. It is clear that a great many additional variations, somewhat different from these may be employed to achieve essentially the same results. All such modifications and variations within the scope of the appended claims are intended to be within the scope and spirit of the present invention.

I claim:

1. A sealing piston ring for preventing blow-by of fluids between such piston ring and a ring retaining groove of a piston, comprising:

a split, resilient, radially compressible piston ring having inside and outside edges; and an annular elastomeric sealing member dimensioned to be received within said ring retaining groove and having (i) an outer circumferential portion in sealing engagement with said inside edge of said piston ring, (ii) an inner circumferential portion at least part of which is dimensioned to be received within and radially unrestrained within a subgroove in a surface of said ring retaining groove, and (iii) an intermediate portion between said inner and outer portions, at least pan of said intermediate portion having a reduced axial cross section and being movable relative to said outer circumferential portion under the influence of fluid pressures within said ring retaining groove to cause said inner circumferential portion to sealingly engage one or more surfaces of said subgroove or ring retaining groove without exerting a substantial radial load upon said piston ring.

2. The sealing piston ring according to claim 1, wherein at least part of said outer circumferential portion of said sealing member is bonded to said inside edge of said piston ring.

3. The sealing piston ring according to claim 1, wherein said outer circumferential portion of said sealing member is received within an annular, circumferential, radially extending groove defining at least pan of said inside edge of said piston ring.

4. The sealing piston ring according to claim 3, wherein at least pan of said outer circumferential portion of said sealing member is bonded to said circumferential, radially extending groove.

5. The sealing piston ring according to claim 1, wherein mid inner circumferential portion comprises a substantially radially unrestrained, enlarged bulbous ring portion having upper and lower faces dimensioned to sealingly engage said subgroove as said bulbous ring portion moves within said subgroove.

6. The sealing piston ring according to claim 5, wherein said bulbous portion is generally circular in cross section.

7. The sealing piston ring according to claim 1, wherein said intermediate circumferential portion comprises a cross-section tapering toward said inner circumferential portion.

8. The sealing piston ring according to claim 1, wherein said intermediate circumferential portion comprises a lobular, generally concentric, circumferentially extending portion at least on the top surface of said sealing member.

9. The sealing piston ring according to claim 1, wherein said intermediate circumferential portion comprises inner and outer lobular, generally concentric, circumferentially extending portions at least on the top surface of said sealing member, said outer lobular portion having a channel formed therein to permit fluid to flow between said lobular portions.

10. The sealing piston ring according to claim 1 for use in an internal combustion engine.

11. The sealing piston ring according to claim 1, further comprising:

a circumferential, outwardly tapered elastomeric wiper extension received within and attached to a circumferential recess in said piston ring to thereby extend the outside edge of said piston ring sufficiently far that in application in a cylinder the outer diameter of said wiper extension will be the first part of said piston ring structure to be contacted and deformed by a wall of said cylinder, said wiper extension having a circumferential groove that is rounded in cross section, said groove extending upwardly from a bottom edge of said wiper extension and extending in a direction away from said outer edge so that said wiper extension gradually thins down to a flap below said piston ring as said wiper extension approaches an opening in the groove, said flap serving as a flap valve so that fluid pressure on said flap makes it more difficult for fluid to pass beneath said piston ring within said ring retaining groove.

12. A piston configuration comprising:

a piston head having an inwardly directed circumferential ring retaining groove;

a split, resilient, radially compressible piston ring having inside and outside edges; and an annular elastomeric sealing member received within said ring retaining groove and being generally unrestrained in the radial direction, said sealing member comprising (i) an outer circumferential portion in sealing engagement with said inside edge of said piston ring, (ii) an inner circumferential portion at least part of which is received within and radially unrestrained within a subgroove in a surface of said ting retaining groove, and (iii) an intermediate portion between said inner and outer portions, at least pan of said intermediate portion having a reduced axial cross section and being movable relative to said outer circumferential portion under the influence of fluid pressures within said ring retaining groove to cause said inner circumferential portion to sealingly engage one or more surfaces of said subgroove or ring retaining groove without exerting a substantial radial load upon said piston ring.

13. The piston configuration according to claim 12, wherein at least pan of said outer circumferential portion of said sealing member is bonded to said inside edge of said piston ring.

14. The piston configuration according to claim 12, wherein said outer circumferential portion of said sealing member is received within an annular, circumferential, radially extending groove defining at lust pan of said inside edge of said piston ring.

15. The piston configuration according to claim 14, wherein at least pan of said outer circumferential portion of said sealing member is bonded to said circumferential, radially extending groove.

16. The piston configuration according to claim 12, wherein said inner circumferential portion comprises a generally radially unrestrained, enlarged bulbous ring portion having upper and lower faces dimensioned to sealingly engage said subgroove as said bulbous ring portion moves within said subgroove.

17. The piston configuration according to claim 16, wherein said bulbous portion is generally circular in cross section.

18. The piston configuration according to claim 12, wherein said intermediate circumferential portion comprises a cross-section tapering toward said inner circumferential portion.

19. The piston configuration according to claim 12, wherein said intermediate circumferential portion comprises at least one lobular, generally concentric, circumferentially extending portion on at least a top surface of said sealing member, said lobular portion having at least one channel to permit fluid to flow past said lobular portion.

20. The piston configuration according to claim 12 for use in an internal combustion engine.

21. The piston configuration according to claim 12, further comprising:

a circumferential, outwardly tapered elastomeric wiper extension received within and attached to a circumferential recess in said piston ring to thereby extend the outside edge of said piston ring sufficiently far that in application in a cylinder the outer diameter of said wiper extension will be the first part of said piston ring structure to be contacted and deformed by a wail of said cylinder, said wiper extension having a circumferential groove that is rounded in cross section, said groove extending upwardly from a bottom edge of said wiper extension and extending in a direction away from said outer edge so that said wiper extension gradually thins down to a flap below said piston ring as said wiper extension approaches an opening in the groove, said flap serving as a flap valve so that fluid pressure on said flap makes it more difficult for fluid to pass beneath said piston ring within said ring retaining groove.

22. A piston configuration for an internal combustion engine comprising:

a piston head having an inwardly directed circumferential ring retaining groove terminating in a wall defining an end of said groove and a subgroove extending radially inwardly from said end of said groove;

a split, resilient, radially compressible piston ring having inside and outside edges, said inside edge of said piston ring defining an annular, circumferential, radially extending groove; and an annular elastomeric sealing member received within said ring retaining groove, said sealing member comprising (i) an outer circumferential portion received within and sealingly engaging said groove in said inside edge of said piston ring, (ii) an inner circumferential portion received within, sealingly engaging, and free to move radially within said subgroove of said ring retaining groove, and (iii) an intermediate portion between said inner and outer portions, at least pan of said intermediate portion having a reduced axial cross section and being movable relative to said outer circumferential portion under the influence of fluid pressures within said ring retaining groove to cause said inner circumferential portion to sealingly engage one or more surfaces of said subgroove or ring retaining groove, said sealing member being generally radially unconstrained within said ring retaining groove and subgroove such that said movement of said intermediate portion of said sealing member exerts a minimal radial load upon said piston ring.

23. The piston configuration according to claim 22, wherein said inner portion of said sealing member comprises a generally radially unrestrained, enlarged bulbous ring portion having upper and lower faces dimensioned to sealingly engage said subgroove as said bulbous ring portion moves within said subgroove.

24. The piston configuration according to claim 23, wherein said bulbous portion has a generally circular cross section.

25. The piston configuration according to claim 24, wherein said intermediate circumferential portion comprises a cross-section tapering toward said inner circumferential portion.

26. The piston configuration according to claim 24, wherein said outer circumferential portion of said sealing member and said radially extending groove of said piston ring are of a generally rectangular cross section.

27. The piston configuration according to claim 22, wherein said intermediate circumferential portion of said sealing member comprises at least one lobular, generally concentric, circumferentially extending portion on at least a top surface of said sealing member, said lobular portion having at least one channel to permit fluid to flow past said lobular portion.

28. The piston configuration according to claim 27, wherein said intermediate circumferential portion of said scaling member comprises first and second generally concentric, circumferentially extending lobular portions on at least the top surface of said sealing member, wherein said reduced axial portion is disposed between said first and second lobular portions and mid channel is formed in mid first lobular portion to permit fluid to flow between said first and second lobular portions above said reduced axial portion.

29. The piston configuration according to claim 22, further comprising:

a circumferential, outwardly tapered elastomeric wiper extension received within and attached to a circumferential recess in said piston ring to thereby extend the outside edge of said piston ring sufficiently far that in application in a cylinder the outer diameter of said wiper extension will be the first pan of said piston ring structure to be contacted and deformed by a wall of said cylinder, said wiper extension having a circumferential groove that is rounded in cross section said groove extending upwardly from a bottom edge of said wiper extension and extending in a direction away from said outer edge so that said wiper extension gradually thins down to a flap below said piston ring as said wiper extension approaches an opening in the groove, said flap serving as a flap valve so that fluid pressure on said flap makes it more difficult for fluid to pass beneath said piston ring within said ring retaining groove.

* * * * *

UNITED STATES PATENT AND TRADEMARK OFFICE
CERTIFICATE OF CORRECTION

PATENT NO. : 5,474,307

DATED : December 12, 1995

INVENTOR(S) : Richard DeBiasse

It is certified that error appears in the above-identified patent and that said Letters Patent is hereby corrected as shown below:

In Claim 29, Column 17, line 13, after the word "first", delete the word "pan" and insert the word --part--.

Signed and Sealed this

Ninth Day of April, 1996

Attest:

BRUCE LEHMAN

Attesting Officer

Commissioner of Patents and Trademarks